Oct. 16, 1945.    W. C. HALL, JR    2,387,016
MAGNETIC POLARITY CHANGING CIRCUIT
Filed July 13, 1943

INVENTOR
WILLARD C. HALL, JR.
BY Earl E. Moore
ATTY.

Patented Oct. 16, 1945

2,387,016

UNITED STATES PATENT OFFICE 2,387,016

MAGNETIC POLARITY CHANGING CIRCUIT

Willard C. Hall, Jr., Los Angeles, Calif., assignor to Helen J. Hall, Jr., Los Angeles, Calif.

Application July 13, 1943, Serial No. 494,487

4 Claims. (Cl. 172—36)

The herein described invention provides a new and novel arrangement for changing or interchanging magnetic flux paths in direction and polarity without employing current switching devices.

One manner of illustrating the application of this invention is, for instance, the changing of the direction of rotation of a motor armature, and which is accomplished simply by rotating a simple form of magnetic spider through a small arc. The drawing shows a magnetic circuit to produce this result. It will be noted that in direct contrast to the conventional field flux paths employed in electrical motors, generators and the like, that the exciting flux is supplied to the armature from a spider having alternate magnetic poles which may be of a permanent magnetic material or electromagnetically excited through a coil system, but that the flux paths are directed longitudinally through isolated magnetic units in the barrel assembly or frame of the motor, to pole projections, which produces the flux at right angles to the flux in the units, then down through the armature and returning through the adjacent isolated U-shaped magnetic units. It is to be noted that the field structure is of an isolated flux path design. In this particular application, the main frame assembly is composed of non-magnetic materials with the exception of the separate and independent flux carrying material comprising the spider and U-shaped isolated polar units and the armature. It is readily seen that a relatively small rotation of the magnetic spider member will reverse the rotation of the armature and that rotation in the opposite direction cause the armature to rotate in the opposite direction.

Many combinations are possible with spiders and isolated flux transferring members or units so that small movements clockwise or anti-clockwise of the spider will cause a reversal of the armature. The armature may have a multi-polar winding for variable speed operation with this circuit arrangement.

It is of importance to note, that the flux supplied from the spider will have a closed path regardless of the signs of the field poles, or when the spider is placed in such a position that the fluxes are shunted perpendicularly through alternate teeth, it will nullify the flux through the armature by simply changing the direction of flux, from the longitudinal position to a perpendicular shunt position between alternate teeth of the exciting spider, thus flux leakage to the air is at an absolute minimum. By providing the armature with high impedance windings, the motor can safely be allowed to remain in the circuit at all times.

It is apparent from the foregoing, that the advantages of this flux interchanging arrangement is varied and many, inasmuch as the requirements for complete and efficient change of polarity may be secured by a slight movement of a magnetic spider in a back and forth movement, thus eliminating electrical contacting switch gears and auxiliary field coil equipment.

The circuit arrangement herein described is not limited to motor equipment or rotary devices, but may be used in various control devices, generators, and electronic equipment, or any application wherein a smooth and efficient change of magnetic polarity is required. This invention is not limited to speed and pole changing of D. C. equipment but has a wide field of application for phase changing, and flux and polarity control of static and electronic control devices both A. C. and D. C.

One of the principal objects of this invention is to present a means and method for changing the direction of fluxes in magnetic circuits and the like without reversing switches or complicated electrical means.

Another object of equal importance is the means and method of reversing flux paths in electrical equipment by a simple mechanical movement.

Another object is to provide flux reversing conditions in electrical devices without producing mechanical or electrical strains upon the material or arrangement of the elements in the device.

Still another object is to shift flux direction in magnetic paths for causing direction reversal of moving electrical things such as motors, reciprocating units, lighting units, etc.

And still another object is to present a new and novel reversible motor that is simple and sturdy in construction, and which is economical to operate and manufacture.

Other objects, advantages and features of my invention will appear from the accompanying drawing, the subjoined detailed description, the preamble of this specification and the appended claims.

Applicant is about to illustrate and describe one of the forms of his invention in order to teach one how to make and use the same, but it is to be understood that the drawing and description thereof are not to limit the invention in any sense whatsoever, except as limited by the appended claims.

Figures 1, 2:
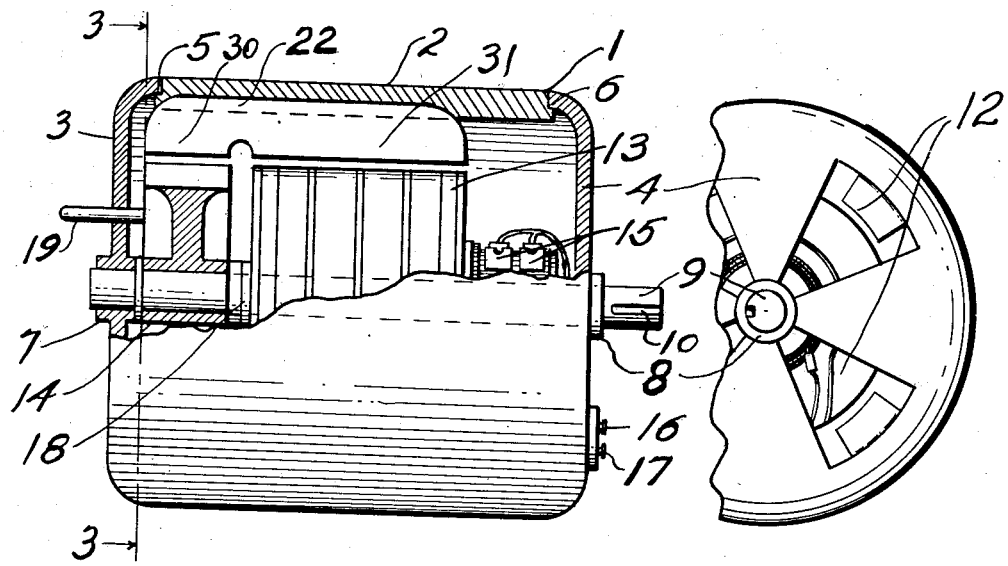
Fig. 1 shows the invention as applied to an electric motor, the motor being shown in elevation with parts thereof being broken away to show internal elements and some of the elements in section.
Fig. 2 is an elevational view of a part of the end plate of the motor.

The outer frame or casing of the motor is indicated at 1, which includes the cylindrical shell 2 and the metal end plates 3 and 4. The shell 2 is preferably made of some non-magnetic material such as aluminum or some magnesium alloy material, and has its ends rabbeted, as at 5 and 6, which is machined to snugly fit the inner peripheries of the end plates 3 and 4; bolts or any other suitable fastening means may be employed to hold the end plates firmly to the shell. The end plate 3 has the integral bearing 7 and the plate 4 the integral bearing 8, both of which support and journal the motor shaft 9. The pulley or gear end of the shaft has a key slot 10. The end plate 3 is provided with a plurality of ventilating openings 11, and the plate 4 is provided with the openings 12.

The shaft 9 supports an armature 13 with its commutator 15 and the polar disc, unit or spider member 14. The armature or power delivery means or element is keyed to the shaft whereas the spider 14 is not, this spider is free wheeling on the shaft so that the shaft can freely rotate without being hindered by the spider member. The armature, as shown, is a lap wound direct current armature with the leads of the armature coils connected in the conventional manner to the various segments of the commutator. The exact nature of the armature is unimportant as there is no claim to any particular armature construction as it, per se, does not enter into the invention except that the armature must be suitably wound and connected for operation in a shunt connected direct current motor. One set of brushes 15 is shown positioned upon the commutator, and obviously, at least another set would be employed in conjunction therewith at a point diametrically opposite. The terminal block with the two terminals 16 and 17 are shown which should be connected to any source of suitable current supply so that the armature can be properly energized. Any sort of suitable bracket means (not shown) may be employed to support the motor or connect same with some machine which is to be operated or controlled thereby.

Between the bearings of the armature and polar spider is the collar or ring 18 which is well lubricated and spaces the armature and spider apart so that the spider can freely rotate on the shaft and independent of its motion. A handle control means, or lever 19 is screwed into the side of the spider 14 and rigidly held thereto so that the spider can be rotated by hand, or by remote means, and shift the poles of the spider in alinement with certain carrier poles to be presently explained. A curved slot 20 in the side of the plate 3 acts as a guide for the handle and limits its movement.

Spaced equally around the armature and the spider are a plurality of arms, pole members or flux transfer means 21 to 28 inclusive, all of which are partially embedded in annularly spaced slots 29 which are cut into the inner surface of the shell 2. Bolts or any other suitable means may be used to securely hold the arms in their respective slots. Each flux transfer member should be laminated and have a small head 30 and a large head 31, the large head being somewhat rectangular in shape on the inner face thereof and the small head being substantially square on the inner face thereof. The large heads form an annular field about the armature whereas the small heads surround the spider 14 and receive their magnetism from the plurality of poles on the spider.

The spider 14 has a plurality of projecting poles numbered 32 to 39 inclusive which are equally spaced and have faces which substantially register, or nearly so, with the faces of the small flux transfer heads 30. As indicated by letters, the poles 32, 34, 36 and 38 are permanently magnetized south poles, whereas poles 33, 35, 37 and 39 are permanently magnetized north poles. Any number of poles may be employed, and in this form of the invention, eight poles were thought sufficient to clearly illustrate the invention. Since the spider has eight poles, the flux transfer members also are eight in number.

Figures 3, 4, 5:
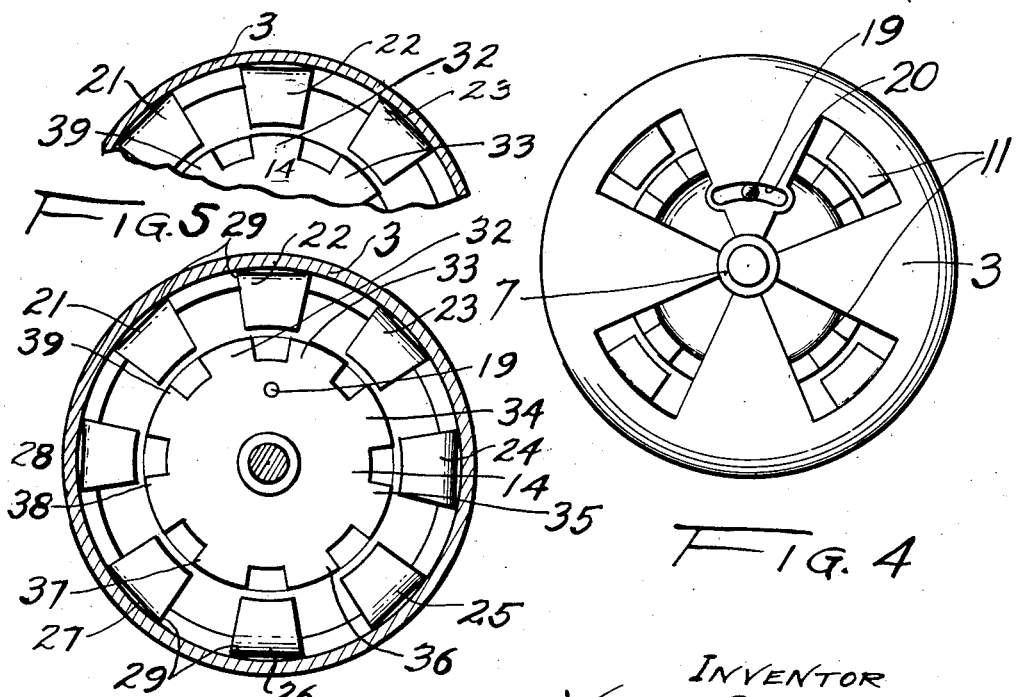
Fig. 3 is a sectional view taken substantially along the line 3—3 of Fig. 1.
Fig. 4 is an elevational view of another end plate of the motor.
Fig. 5 is a sectional view of a portion of the invention taken partly along the line 3—3 of Fig. 1, but showing certain elements thereof in a different position.

From the foregoing, it is clear that none of the small flux transfer heads 21 to 28 inclusive become south or north poles when the spider (permanent poles) are in the position shown in Fig. 3 of the drawing. But, however, when the handle 19 is operated so as to bring the poles of the spider into alinement with the small heads of the flux transfer heads, the heads opposite the various poles on the spider will have exact opposite polarity than the poles they are in alinement with, therefore, whenever it is desired to reverse the direction of the motor armature, it is only necessary to move the handle 19 and change the polarity of the small heads and hence change the polarity of the large heads 31. It is well known that a direct current motor with a shunt field can have its rotation reversed by merely changing the polarity of the field poles. Since the armature is wound in order to give the coils thereon a high impedance, the motor can be left in the line circuit with safety. This being the case, the motor can be stopped by merely moving the handle 19 so as to place the spider poles in the positions shown in Fig. 3 relative to the small heads 21 to 28.

In the event that electromagnetic poles are preferred upon the poles of the spider 14 in place of the permanent magnets, the spider need not be changed entirely except that it should be soft iron and laminated. With such a change in the spider, each pole would have a field coil connected together in proper order and the leads therefrom connected in parallel with the terminals 16 and 17 outside the motor casing.

It is, of course, understood that various changes and modifications may be made in the details of form, style, design and construction of the whole or any part of the specifically described embodiment of this invention without departing from the spirit thereof, such changes and modifications being restricted only by the limitations clearly expressed in the following claims.

Having thus described my invention, what is claimed as new and desired to be secured by Letters Patent is:

1. An electrical device having a rotor element with a shaft fixed thereto, a shiftable polar unit having radially disposed pole faces axially of the element and journalled to the said shaft, and flux transfer means having pole pieces at the ends thereof, the pole pieces at one of the ends of the means surrounding the element and the pole pieces at the other ends of the means surrounding the unit, said polar unit having means for shifting it rotatively so as to change the flux direction in the transfer means and in the power delivery element.

2. The device recited in claim 1 wherein the unit has a hub with a plurality of radially extended arms for supporting the pole faces, and a control handle means fixed to a portion of the unit for shifting the unit with respect to the transfer means.

3. In an electrical device having a housing with a shaft therethrough, an armature keyed to the shaft and a polar unit journalled on said shaft for free shifting thereon, a plurality of flux transfer members spaced apart around the periphery of the armature and the unit and fixed to an inner surface of the housing, means concentric with the shaft and keyed thereto for conducting electrical currents between the armature and an outside circuit, and said transfer means having end pieces slightly spaced from the outer surfaces of the unit and the armature.

4. The device recited in claim 3 wherein the housing encloses the armature and unit and the housing is constructed of non-magnetic material, a curved slot in the housing at one end thereof, and a handle means extending from the unit through the slot for exterior operation of the polar unit.

WILLARD C. HALL, JR.